(12) United States Patent
Jaroschek

(10) Patent No.: US 7,192,269 B2
(45) Date of Patent: Mar. 20, 2007

(54) DEVICE FOR THE INJECTION MOULDING OF MOULDED BODIES MADE FROM PLASTIC

(75) Inventor: Christoph Jaroschek, Bielefeld (DE)

(73) Assignee: Monika Werner, Bad Salzufien (DE)

( * ) Notice: Subject to any disclaimer, the term of this patent is extended or adjusted under 35 U.S.C. 154(b) by 0 days.

(21) Appl. No.: 10/511,776

(22) PCT Filed: Apr. 17, 2002

(86) PCT No.: PCT/EP02/04227

§ 371 (c)(1),
(2), (4) Date: Aug. 8, 2005

(87) PCT Pub. No.: WO03/086729

PCT Pub. Date: Oct. 23, 2003

(65) Prior Publication Data

US 2006/0003048 A1  Jan. 5, 2006

(51) Int. Cl.
*B29C 45/32* (2006.01)
(52) U.S. Cl. ............... 425/572; 425/588; 425/595
(58) Field of Classification Search ........ 425/338, 425/572, 588, 589, 595
See application file for complete search history.

(56) References Cited

U.S. PATENT DOCUMENTS

| | | | |
|---|---|---|---|
| 2,209,141 A | | 7/1940 | Schnell |
| 3,647,338 A | * | 3/1972 | Ise ........................ 425/588 |
| 3,843,294 A | * | 10/1974 | Bielfeldt et al. ......... 425/572 |
| 3,973,892 A | * | 8/1976 | Rees ...................... 425/572 |
| 4,400,341 A | | 8/1983 | Sorensen |

(Continued)

FOREIGN PATENT DOCUMENTS

EP   0103363   3/1984

(Continued)

OTHER PUBLICATIONS

C. Jaroschek, "Doppelte Leistung Tandemwerkzeuge Fuer Standardmaschinen", Aug. 2002, Bd. 91, Nr. 8, Seiten 53-55, XP001124883.

*Primary Examiner*—James P. Mackey
(74) *Attorney, Agent, or Firm*—Alfred A. Fressola; Ware, Fressola Van Der Sluys & Adolphson LLP

(57) ABSTRACT

A device for the injection moulding of moulded bodies made from plastic is disclosed, comprising an injection moulding unit (1) and a tool (2) dedicated thereto. At least two cavities (11, 12), corresponding to the dimensions of the moulded body for production are provided on the tool (2) and the tool comprises at least three pieces (4, 5, 6), which move relative to each other and which lie adjacent to each other on separating planes (9, 10). Each separating plane (9, 10) runs through at least one cavity (11, 12). At least one channel (13) for the introduction of molten plastic is provided in the tool (2), which terminates at one end in the cavities (11, 12) and at the other end thereof at an inlet (14) on the surface of the tool (2), which is connected to the injection moulding unit (1) in the working position. In order to increase the number of moulded bodies produced per unit time, a channel (13) is provided in the tool (2), reaching from the inlet (14) to a first separating plane (9) and further leading to the second separation plane (10).

6 Claims, 3 Drawing Sheets

U.S. PATENT DOCUMENTS

| | | |
|---|---|---|
| 4,539,171 A | 9/1985 | Sorensen |
| 4,971,747 A * | 11/1990 | Sorensen ..................... 425/572 |
| 4,990,299 A * | 2/1991 | Sorensen ..................... 425/338 |
| 5,043,129 A * | 8/1991 | Sorensen ..................... 425/572 |
| 5,044,927 A * | 9/1991 | DiSimone et al. .......... 425/572 |
| 5,069,615 A * | 12/1991 | Schad et al. ................ 425/572 |
| 5,464,579 A * | 11/1995 | Brown et al. ............... 425/572 |
| 5,484,275 A * | 1/1996 | Kushnir ...................... 425/572 |
| 6,086,808 A * | 7/2000 | Sorensen et al. ........... 264/250 |
| 6,089,852 A | 7/2000 | Klanfar et al. |

FOREIGN PATENT DOCUMENTS

| | | |
|---|---|---|
| JP | 56086730 | 7/1981 |

\* cited by examiner and from which priority is claimed under all applicable sections of Title 35 of the United States Code including, but not limited to, Sections 120, 363 and 365(c).

DEVICE FOR THE INJECTION MOULDING OF MOULDED BODIES MADE FROM PLASTIC

CROSS REFERENCE TO RELATED APPLICATIONS

This application is for entry into the U.S. national phase under §371 for International Application No. PCT/EP02/04227 having an international filing date of Apr. 17, 2002, and from which priority is claimed under all applicable sections of Title 35 of the United States Code including, but not limited to, Sections 120, 363 and 365(c).

TECHNICAL FIELD

The invention concerns a device for the injection molding of parts made of plastic, comprising an injection molding machine and a tool dedicated thereto, where the tool contains at least two cavities that correspond to the dimensions of the molded parts to be produced, were the tool is composed of at least three parts that are able to move in relation to each other, and in the working position are firmly pressed together along separation planes that pass through the cavities and are parallel to each other and at right angles to the moving direction of the parts, where each separation plane runs through at least one cavity, and where the tool contains at least one channel for the introduction of molten plastic, which on the one hand ends in the cavities and the other in an inlet area on the surface of the tool, and in the working position is connected to the injection molding machine (German magazine "Plastics 84", (1994) 10, pages 1375 to 1382).

BACKGROUND OF THE INVENTION

Injection molding machines are used to produce molded parts of almost any shape. The respective tool only needs to include cavities into which molten plastic can be injected. In the working position for example, the parts of the tool that are separated by a separation plane are firmly pressed together hydraulically. After the plastic has been injected into the cavities of the tool, it usually remains closed in the conventional technique, until the molded parts in the cavities have sufficiently cooled and solidified so that they can be removed from the tool. To that end the tool is opened along the separation plane and its parts are separated from each other. During the time when the plastic of the molded parts cools, the injection molding machine is not used. This disadvantage is particularly significant when relatively thick-walled molded parts which require an extended cooling period are being produced.

The output of an injection molding machine can be increased if a tool is used that works in tandem according to the cited German magazine "Plastics 84". In an injection molding machine that operates with such a tool, the parts alternately open along two separation planes. During the cooling time of the molded parts in one separation plane, the molded parts can be removed from the other separation plane. This operation is advantageous for molded parts with a cooling period that is longer than the metering time needed to fill the cavities. Injection molding machines which operate in tandem are very special expensive machines. They require a moveable central plate that is installed in the middle, and to which the injection molding unit is laterally attached. The molten plastic is injected into the respective cavities through channels located in the central plate. This known tandem technique cannot be installed in conventional injection molding machines, or only after extensive rebuilding.

SUMMARY OF THE INVENTION

The object of the invention is to design the above described device in a way so that the output of finished molded parts can be increased in a simple manner, even when conventional injection molding machines are being used. The invention achieves this object in that:

the tool is equipped with a channel that extends from the inlet area to a first separation plane, and then continues to the second separation plane, and has partial channels which extend to the cavities;

the parts of the tool are equipped with a lock which can be adjusted between two positions, where in a first position only a central part and a front part containing the inlet area of the channel are locked together, and in a second position only the central part and a rear part of the tool are locked together.

This device can be used in conventional, commercial injection molding machines without the need for rebuilding or special additional measures. It only requires that a simple tool, which was used until now and contains only two parts separated by one separation plane be replaced with the new tool that contains three parts and has two separation planes. Similar to the described tandem technique, this tool increases the output of molded parts in that, while the molded parts in the area of one of the separation planes are being removed, the plastic that was injected into the cavities of the other separation plane is cooling. The lock used for the parts of the tool during the respective cooling phase is of considerable significance for this device. It can easily be adjusted between two positions. While two parts of the tool are locked together and maintain a firm residual force, the molded parts are cooling and the separation plane of the third part can simultaneously be opened to remove finished molded parts. After this separation plane has been closed and plastic has been injected into its cavities, the lock is brought into its second position while the tool is still securely locked. The two parts of the tool with the newly filled cavities then remain tightly locked together, while the previously locked separation plane can now be opened to remove the molded parts that have cooled in the meantime, as soon as the pressure force which acts on the tool during the injection process is lifted.

BRIEF DESCRIPTION OF THE DRAWINGS

The drawings illustrate embodiments of the subject of the invention, where.

DETAILED DESCRIPTION

The drawings only illustrate the parts of an injection molding device that are necessary to understand the invention. Basically known elements, such as for example the opening and closing mechanism or the cooling channels or heating devices are not shown.

The invention can be used for devices with a "hot channel" and a "cold channel". In the following, FIGS. 1 to 6 are used for a detailed description of the embodiment with a cold channel. The application for the embodiment with a hot channel applies in analog form.

Figure 1:
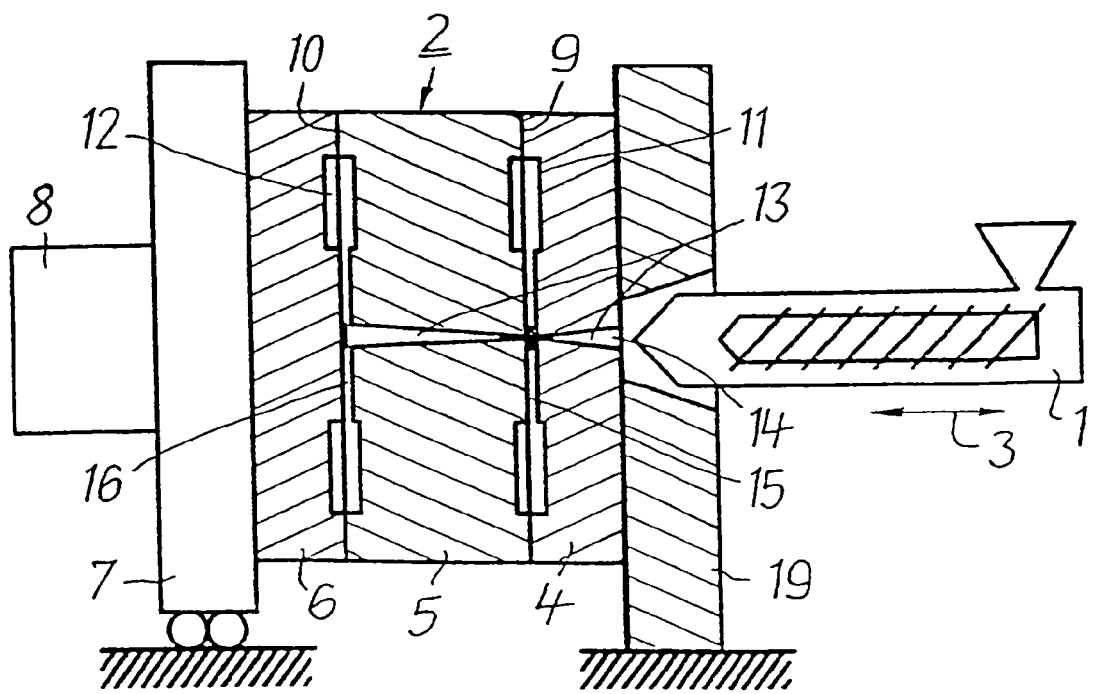
FIG. 1 is a schematic illustration of a partial section of the device of the invention in the closed position.
Figure 2:
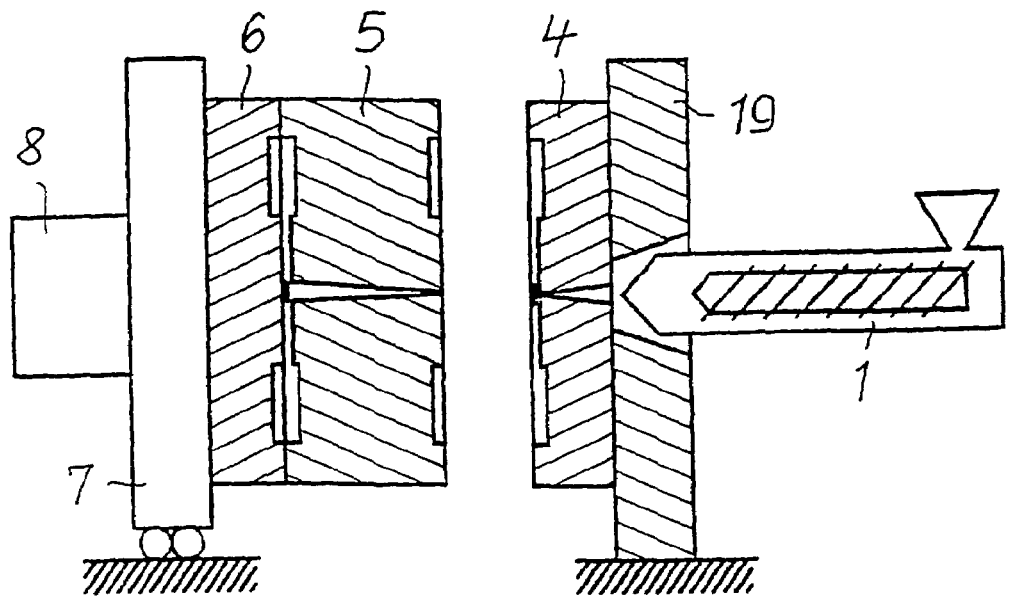
FIGS. 2 and 3 are two different open positions of the device in FIG. 1.
Figure 3:
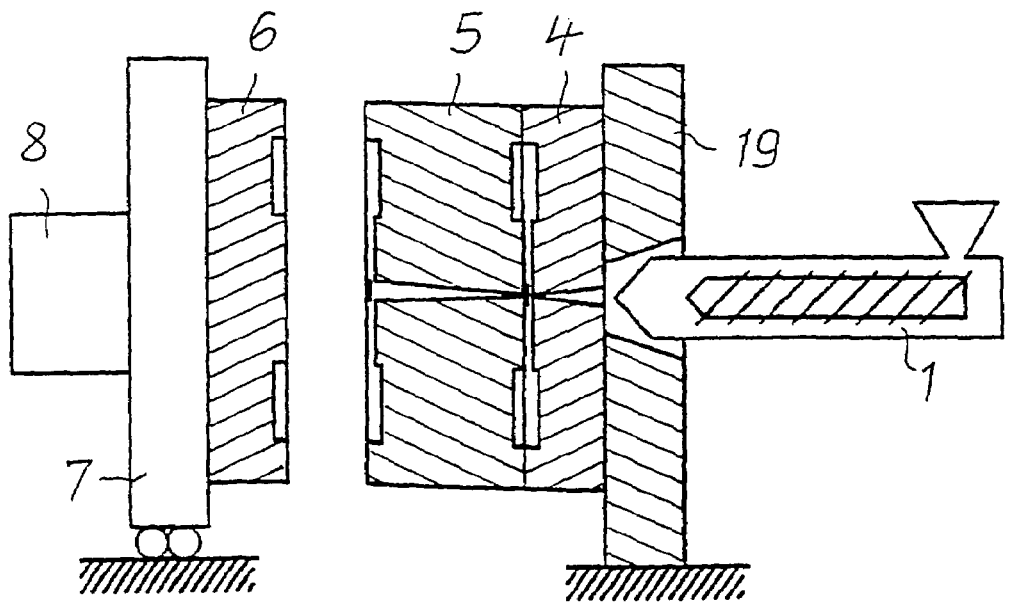

The injection molding device in FIG. 1 comprises an injection molding machine 1 and a tool 2 which can be connected thereto. The injection molding machine 1 may be a conventional, commercial machine without any optional equipment. It can move in the direction of double arrow 3.

The tool 2 is composed of three parts, a front part 4, a central part 5 and a rear part 6. A pressure plate 7 closes off the rear part 6 and is connected to a pressure generator 8. The pressure generator 8 can be a hydraulic or pneumatic press, for example. The three parts of tool 2 are separated from each other by two parallel running separation planes 9 and 10. Each separation plane 9 and 10 contains at least one cavity 11 or 12 of tool 2, and their internal dimensions correspond to the geometric shape of the molded parts to be produced. The illustrated embodiment has two cavities 11 or 12 in each separation plane 9 or 10.

A channel 13 is centrally located in the tool 2 and is used to supply molten plastic to the cavities 11 and 12. The channel 13 begins in an inlet area 14 which is open to the outside and is located in a surface of the tool 2. It first extends to separation plane 9 in part 4 of the tool 2, and then continues to separation plane 10 in the central part 5 of the tool 2. As shown in the drawing, the channel 13 has a conical shape in both sections so that the molded plastic material can easily be removed from the channel 13 after cooling. Partial channels 15 or 16 come from the channel 13 and extend to the cavities 11 or 12. The partial channels 15 or 16 are preferably located in the separation planes 9 and 10.

Figure 4:
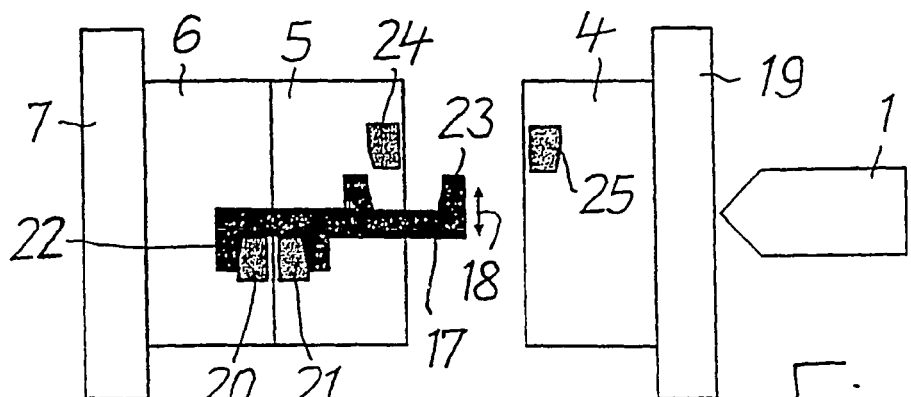
FIGS. 4 and 5 are an embodiment of the lock which can be adjusted in two different positions on the device.
Figure 5:
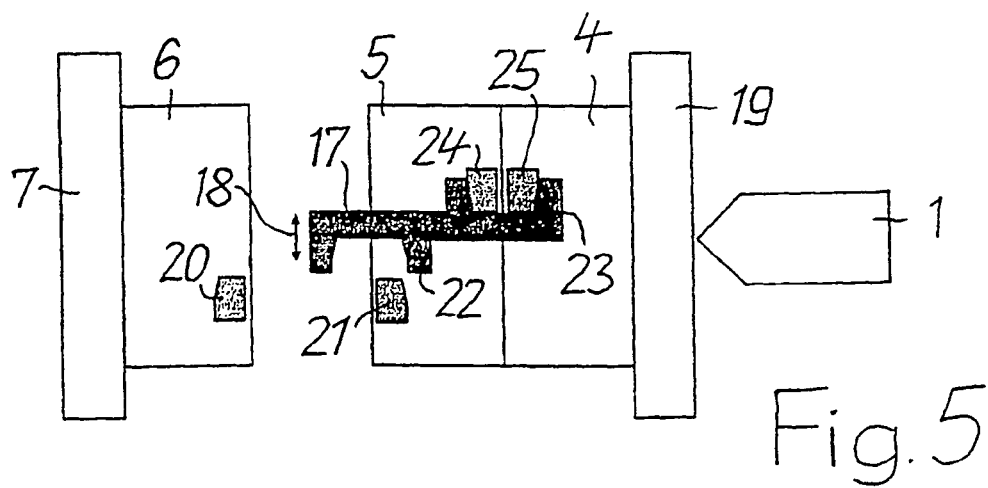

As shown for example in FIGS. 4 and 5, a lock with a bolt 17 is located on the outside of tool 2 and can be adjusted between two positions as indicated by the double arrow 18. In the position of the bolt 17 shown in FIG. 4, the parts 5 and 6 of the tool 2 are locked together, while in its second position shown in FIG. 5 the parts 5 and 4 of said tool 2 are locked together. A more precise construction of the locks that can be used with the device is described below by means of FIGS. 4 to 6.

The device in FIG. 1 operates as follows:

Let us assume that the front part 4 of tool 2 is secured by a limiting retaining plate 19. In order to produce molded parts in cavities 11 and 12, the injection molding machine 1 is moved up to the inlet area 14 of the channel 13 in tool 2. Molten plastic, which is located in the injection molding machine 1, is then pressed into the channel 13. It fills the cavities 11 and 12 via the channel 13 and the partial channels 15 and 16. Once the cavities 11 and 12 have been filled when sufficient pressure is used, the injection molding machine 1 is closed. The plastic in tool 2 is then allowed to cool.

After an adequate cooling period, the injection molding machine 1 is pulled away from the tool 2 and the latter is opened along separation plane 9. At this point its parts 5 and 6 are still locked together. They can be brought into the position shown in FIG. 2 together with the moveable pressure plate 7, after the pressure force produced by the pressure generator 8 has been turned off. The lock in this case is so advantageously designed that after the pressure force of pressure generator 8 has been turned off, a residual force remains to keep the two parts of tool 2 together. The molded parts in the cavities 11 can now be removed from the tool 2. Any plastic remaining in the channel 13 in part 4 of the tool 2 can then be removed by means of compressed air for example, so that this part of the channel 13 is made available again.

After that the tool 2 is again placed in the closed or working position shown in FIG. 1, where the parts 4, 5 and 6 of the tool 2 are firmly pressed together by the pressure generator 8. The injection molding machine 1 is again moved toward the tool 2 and the cavities are once again filled with plastic. Subsequently the lock is brought into its second position where the parts 5 and 4 of tool 2 are locked together as described earlier. The tool 2 then opens along separation plane 10, where only its rear part 6 with the pressure plate 7 moves into the position shown in FIG. 3. The finished molded parts in the cavities 12 and any remaining plastic in the channel 13 of the central part 5 of tool 2 can be removed. During this period the plastic in cavities 11 of separation plane 9 cools.

As already described, the tool 2 is again placed into its closed or working position shown in FIG. 1. Any plastic remaining in the channel 13 portion of part 4 can be removed again with compressed air for example. The injection molding machine 1 is moved once more toward the tool 2. The cavities 12 are again filled with plastic and parts 5 and 6 are locked together again. In the meantime the molded parts in the cavities 11 have cooled so that the tool 2 can be opened along separation plane 9 as described earlier. In this way the cavities 11 and 12 are always and alternately filled with plastic and emptied after cooling.

The cooling of the plastic in cavities 11 and 12 requires that the pertinent two parts of the tool 2 remain locked together after the pressure force provided by pressure generator 8 has been turned off. To that end a lock that maintains a residual force can be used, which is present at least on one side of the device, but is more advantageous if it is present on at least two different sides thereof. For example a lock as shown in FIGS. 4 and 5 can be used. It is composed of a bolt 17 which is located on the central part 5 of tool 2 and can be moved in the direction of double arrow 18. In the position shown in FIG. 4, the central part 5 and the rear part 6 of tool 2 are locked together. To that end conical projections 20 and 21 are placed on both parts 5 and 6, and a corresponding fork 22 of bolt 17 encompasses them. In this position the fork 23, which is located on the other end of the bolt 17, is not in operation. In the second position of the bolt 17, the fork 23 encompasses the projections 24 and 25 which are located on the central part 5 and on the front part 4 of tool 2. To that end and when the tool is closed, bolt 17 only needs to be pushed "upward" into the position shown in FIG. 5. The rear part 6 of tool 2 can then be moved to open the separation plane 10.

Instead of a bolt 17 that can be moved between two positions as shown in FIGS. 4 and 5, a correspondingly designed bolt which can be inclined into two positions could also be used. Electromagnets can also be used as elements of a lock, which alternately and securely connect (lock together) the front part 4 or the rear part 6 of tool 2 with the central part 5.

Figure 6:
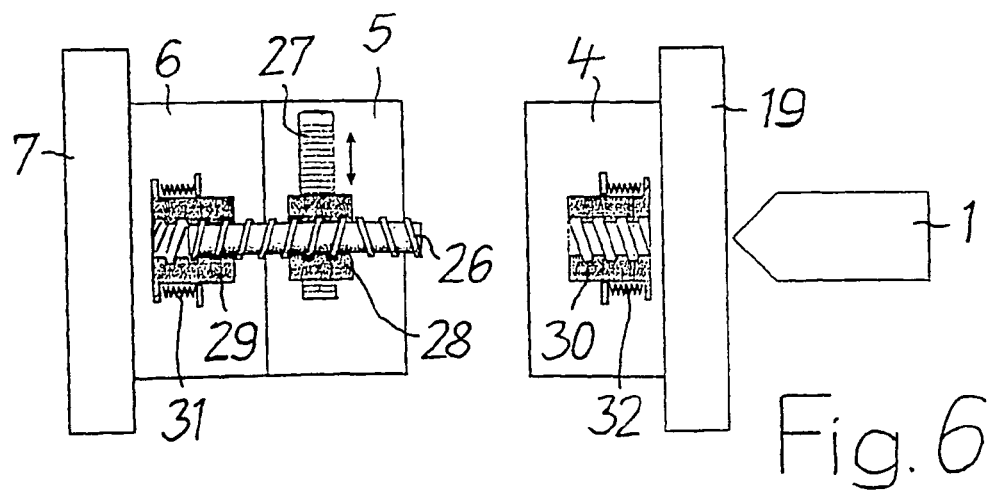
FIG. 6 is a different embodiment of the lock with respect to FIGS. 4 and 5.

To lock the parts 4, 5 and 6 of tool 2 in the manner described by FIGS. 4 and 5, a threaded rod 26 with a trapezoidal thread as shown in FIG. 6 can also be used, and be rotated by a drive 27 via a bushing 28. In this way it can be rotated to either form a seat 29 for the rear part 6 of tool 2 (FIG. 6) or form a seat 30 for the front part 4 of same. The seats 29 and 30 can be supported by springs 31 or 32 to ensure sufficient pressure force (residual force) in the respective locked position. A toothed rack with correspondingly designed adjusting elements could also be used instead of the threaded rod 26.

What is claimed is:

1. A device for the injection molding of parts made of plastic, comprising:

a conventional injection molding machine and a tool dedicated thereto, where said tool contains at least two cavities that correspond to the dimensions of the molded parts to be produced, where the tool comprises at least a front part, a central part and a rear part which are moveable in relation to each other, and which in an operating position are firmly pressed against each other by a pressure force of a pressure generator along at least first and second separation planes that pass through the cavities and are parallel to each other and at right angles to the moving direction of the at least front part, central part and rear part, wherein for use of the conventional injection molding machine a centrally located channel is provided in the front part of the tool which extends from an inlet area to the first separation plane, and continues to the second separation plane within the central part of the tool, the channel having a conical shape within the front part of the tool and a conical shape within the central part of the tool, and partial channels extending from the channel to the at least two cavities, and a lock, moveable between first and second positions, said lock located on the parts of the tool, where, after lifting of the pressure from the pressure generator in the first position, only the central part and the front part of the tool that contains the inlet area of the channel are locked together, and in the second position only the central part and the rear part of the tool are locked together with residual force respectively, wherein moving of the lock between the first and second positions is done by the pressure generator.

2. A device as claimed in claim 1, wherein the partial channels are located in the separation planes.

3. A device as claimed in claim 2 wherein the lock can be adjusted by a sliding bolt.

4. A device as claimed in claim 2 wherein the lock can be adjusted by a rotating threaded rod.

5. A device as claimed in claim 1 wherein the lock can be adjusted by a sliding bolt.

6. A device as claimed in claim 1 wherein the lock can be adjusted by a rotating threaded rod.

* * * * *